(12) United States Patent
Heinecke et al.

(10) Patent No.: US 6,745,999 B1
(45) Date of Patent: *Jun. 8, 2004

(54) GATE VALVE FOR HIGH-DENSITY SLURRIES, AND A VALVE BODY ASSEMBLY, AND A SOLIDS-CONTAINING WALL LINING MEANS THEREFOR

(75) Inventors: Richard L. Heinecke, Belden, MS (US); Bruce Knobbe, Greenwood Springs, MS (US)

(73) Assignee: ITT Manufacturing Enterprises, Inc., Wilminington, DE (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 599 days.

(21) Appl. No.: 09/004,564

(22) Filed: Jan. 8, 1998

(51) Int. Cl.$^7$ .................................................. F16K 3/00
(52) U.S. Cl. ........................ 251/196; 251/327; 251/328
(58) Field of Search ............................... 251/171, 196, 251/202, 327, 329, 326, 328

(56) References Cited

U.S. PATENT DOCUMENTS

| | | | | |
|---|---|---|---|---|
| 3,906,992 A | * | 9/1975 | Leach ..................... | 251/329 X |
| 3,938,779 A | * | 2/1976 | Benjamin ............... | 251/327 X |
| 4,009,727 A | * | 3/1977 | Bailey .................... | 251/326 X |
| 4,221,307 A | * | 9/1980 | Peterson ................. | 251/328 X |
| 4,225,115 A | * | 9/1980 | Miller ..................... | 251/327 |
| 4,377,274 A | * | 3/1983 | Mayhew, Jr. ............ | 251/327 |
| 5,449,146 A | * | 9/1995 | Weagraff ................ | 251/329 X |
| 5,464,035 A | * | 11/1995 | Heinecke ................ | 251/327 X |

* cited by examiner

Primary Examiner—John Bastianelli

(57) ABSTRACT

Flexible, plastic, solids-containing liners or panels are disposed in the chamber of the valve body for contacting, interfacing engagement with the gate. Accordingly, the panels and gate substantially fully occupy the chamber, and prevent an entry of slurry solids thereinto. The panels are rubber-backed to insure that the panels are pressed, sealingly, against the flat faces of the gate, and are arranged in parallel with the chamber walls.

6 Claims, 5 Drawing Sheets

GATE VALVE FOR HIGH-DENSITY SLURRIES, AND A VALVE BODY ASSEMBLY, AND A SOLIDS-CONTAINING WALL LINING MEANS THEREFOR

This invention pertains to slurry valves, and in particular to slide gate valves designed especially for handling of high-density slurries, and to a valve body assembly, and a solids-containing wall lining means, for use in such gate valves.

BACKGROUND OF THE INVENTION

Valves used in slurry service are subject to problems with the buildup of the slurry in cavities of the valve body, and jamming of the valve closure member, preventing the valve from opening or closing. Knife gate valves, and slide gate valves are some of the valves which are least susceptible to this problem, and are many times used in slurry service. The type of valve which is used depends upon the solids concentration, flowability of the solids, and the tendency of the solids to settle and pack in cavities. Knife gate valves rely on the cutting edge of the blade to pass through the solid materials. Slide gate valves have a through-ported gate, a gate with a round portway through which the material flows when the gate is in an open position. As the valve is closed, the gate portway moves through the slurry and displaces the solids, and does not cut through the solids. The knife gate is used when the solids are in low concentrations and flowable. The slide gate valve is used when the slurry is of high density or tends to settle and pack, and a knife gate will not cut through the solids.

For applications where the slurry has an extreme tendency to pack and solidify, slide gate valves utilize portway sealing, when in an open or closed position, so that the slurry does not enter the valve body. The body is not a pressure-containing member, so any solids escaping past the primary portway seal, during cycling, are allowed to spill out of the body, and not collect in body crevasses. This eliminates the chance for solids buildup in areas that prevent the valve gate from operating, but has the shortcoming of allowing the slurry media to spill into the environment.

Other versions of the slide gate valve have slurry-containing, sealed bodies to prevent spillage, but have the shortcoming of leakage of the slurry into body cavities, during cycling, that causes jamming of the valve closure member. A solution, to prevent the solids buildup from jamming, is to use flushports located in the body walls to flush out the solids from critical body cavities. This approach has the shortcomings of requiring flushing lines to be piped to the valve, and a control system to control the flow of flushing media. Also, many processes can not allow for the dilution or contamination of the flushing media in the process media.

A preferred valve, for high-density slurry, will have a gate and seal design which will (a) contain the solids from leaking externally, and (b) also prevent the solids from building up in valve body cavities, this without a need for flushing.

SUMMARY OF THE INVENTION

To avoid the aforecited shortcomings and limitations of performance, it is an object of this invention to set forth a slide gate valve for high-density slurries, comprising a valve body having (a) a plurality of mutually confronting, parallel walls, and (b) a chamber, therewithin, formed by said walls; wherein a pair of said confronting walls have apertures formed therein; and a gate disposed in said chamber for reciprocation therein, between said pair of walls, for occluding and exposing said apertures; first means, coupled to said gate for effecting reciprocation of said gate; second means, arranged in said chamber, for (a) engaging opposite sides of said gate, and (b) prohibiting an entry of slurry solids into said chamber; and means engaging said pair of walls for urging said second means into fast, sealing engagement with said gate.

It is also an object of this invention to disclose a valve body assembly, for use in a gate valve for high-density slurries, comprising a valve body having (a) a plurality of mutually confronting, parallel walls, and (b) a chamber, therewithin, formed by said walls; wherein a pair of said walls have apertures formed therein; lining means, arranged in said chamber, in parallel with said pair of walls, for engaging opposite sides of a valving gate, and for prohibiting, in cooperation with such a valving gate, an entry of slurry solids into said chamber; and means engaging said pair of walls for urging said lining means into a fast, sealing engagement with such a valving gate.

Further, it is an object of this invention to set forth, for use in a gate valve having a body with a chamber formed therein by a plurality of walls, wall lining means for cooperation with a valving gate, for prohibiting an entry of solids into said chamber, comprising panels of plastic, flexible material for arrangement in said chamber, in parallel with a pair of said walls, and for engaging opposite sides of a valving gate; and wherein said panels each have a layer of elastomeric material integral therewith.

Further objects of this invention, as well as the novel features thereof, will be apparent by reference to the following description, taken in conjunction with the accompanying figures.

DESCRIPTION OF THE PREFERRED EMBODIMENT

Figure 1:
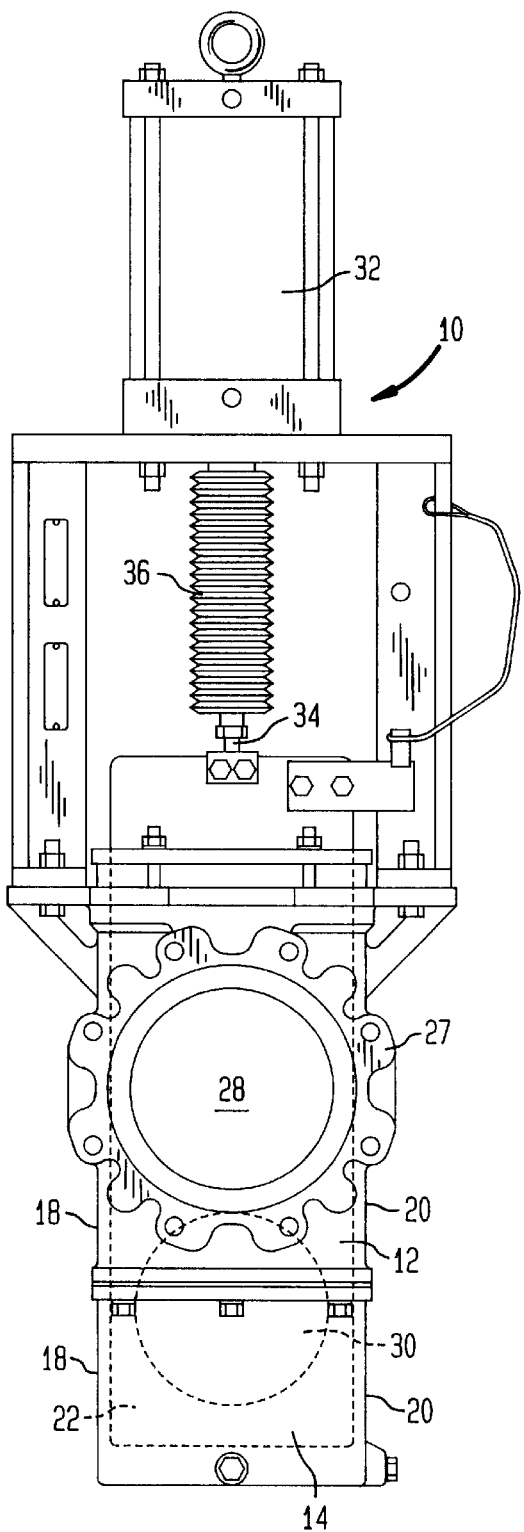
FIG. 1 is a frontal, vertical elevational view of the novel slide gate valve, according to an embodiment thereof.

In general terms, the inventive slide gate valve 10 is substantially similar to the gate-type, side-ported, line blind valve disclosed in U.S. Pat. No. 5,464,035, of Nov. 7, 1995, by Richard L. Heinecke. Accordingly, for a background understanding of the basic structure of the instant valve, the aforesaid patent is hereby incorporated by reference. The valve 10 of FIGS. 1–3, has a body 12 having spaced-apart, front and rear walls 14 and 16, respectively, and side walls 18 and 20, these walls being cooperative to define therewithin a chamber 22. The front and rear walls 14 and 16 have apertures 24 and 26 formed therein, the apertures being rimmed by pipeline bolting flanges 27 (only one of which is shown).

A slide gate 28 is reciprocably disposed in the chamber 22, and has an aperture 30 formed therein for correspondence and registry with the apertures 24 and 26 when the valve 10 is open. As shown in FIG. 1, particularly, the valve 10 is in its closed disposition, with its apertured portion being confined within the lower portion of the chamber 22. The valve 10 comprises a fluid actuator 32 which, through a linkage 34 and an accordion-type boot 36, is used to cause reciprocation of the gate 28 within the chamber 22.

As noted in the foregoing, a principal difficulty which attends slide gate valves of this type is that of containing the slurry solids, and preventing them from entering the crevasses and interstices of the valve body where they can cause a solids buildup. The instant invention addresses this matter, by presenting an efficient sealing of the chamber 22 in cooperation with the slide gate 28.

Figure 2:
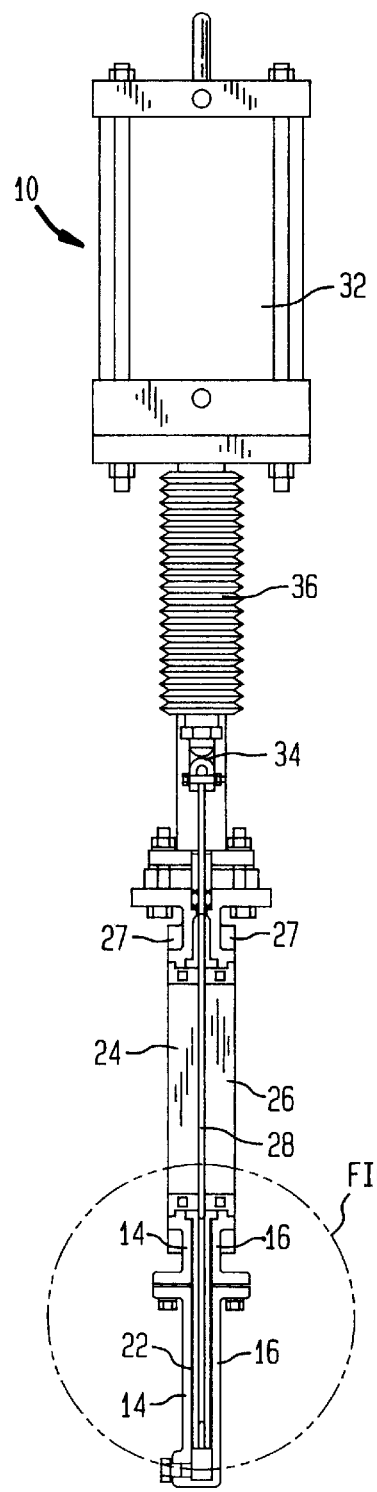
FIG. 2 is a part cross-sectional, and part side elevational view of the valve of FIG. 1.
Figure 3:
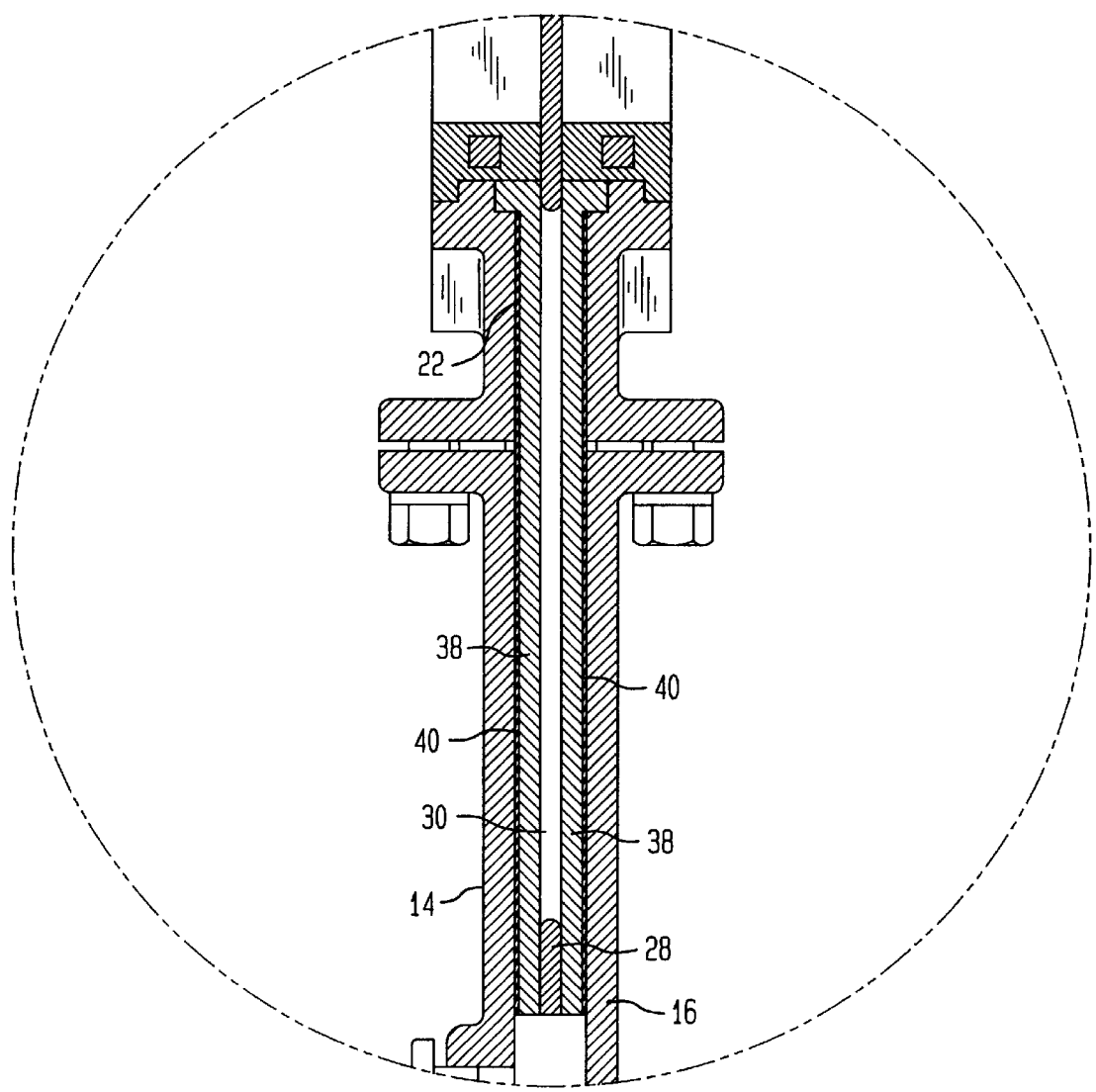
FIG. 3 is a greatly enlarged depiction of the circled area of FIG. 2.
Figure 4:
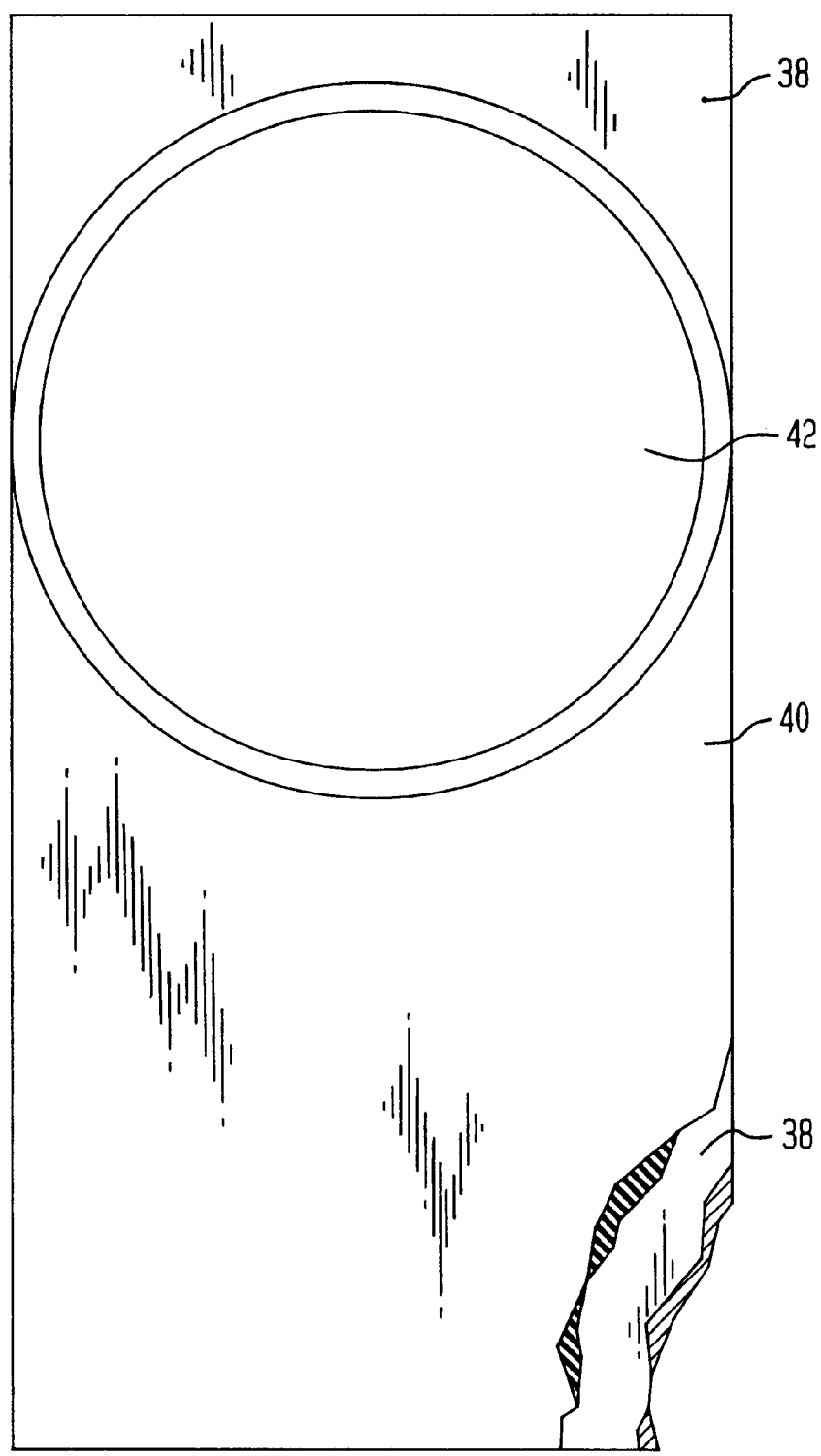
FIG. 4 is a plan view of an embodiment of the novel lining for the chamber walls.

FIG. 3 shows in greatly enlarged detail the portion of the valve 10 which, in FIG. 2, is circled. Herein is seen the gate 28 and its aperture 30. Similarly, as set out in the aforesaid U.S. Pat. No. 5,464,035, valve 10 has liners 38 arranged in the chamber 22 in parallel with, and in contacting engagement with, the gate 28. Consequently, the gate 28 and the liners 38 substantially fully occupy the chamber 22. However, to insure against the entry of slurry solids into the chamber, the liners 38 have means interposed between the walls 14 and 16, and the gate 28, for urging the liners into fast, sealing engagement with the gate 28. The latter means are layers 40 of rubber which are integral with the liners 38. FIG. 4 depicts a greatly enlarged, plan view of one of the liners 38, the view showing an aperture 42 formed in the liner for registry with the body apertures 24 and 26. In addition, portions of the liner 38 are cut away to display the plastic nature of the liner 38 and the rubber layer 40 integral therewith. Due to the elastomeric layers 40, the liners 38 fit tightly against the flat faces of the gate 28 so that the solids in the slurry are contained in the pipeline (not shown) or within the portway defined in the gate 28 by its aperture 30, and are not allowed to collect and build up in the recesses of the chamber 22. Solids are held within the gate 28 portway aperture 30, as the valve 10 strokes to the closed position, and they are transferred back to the pipeline (not shown) as the gate 28 strokes back to the open position. By eliminating the collection of solids in the valve body 12, the gate 28 is free to cycle and does not become jammed by solids buildup.

Figure 5:
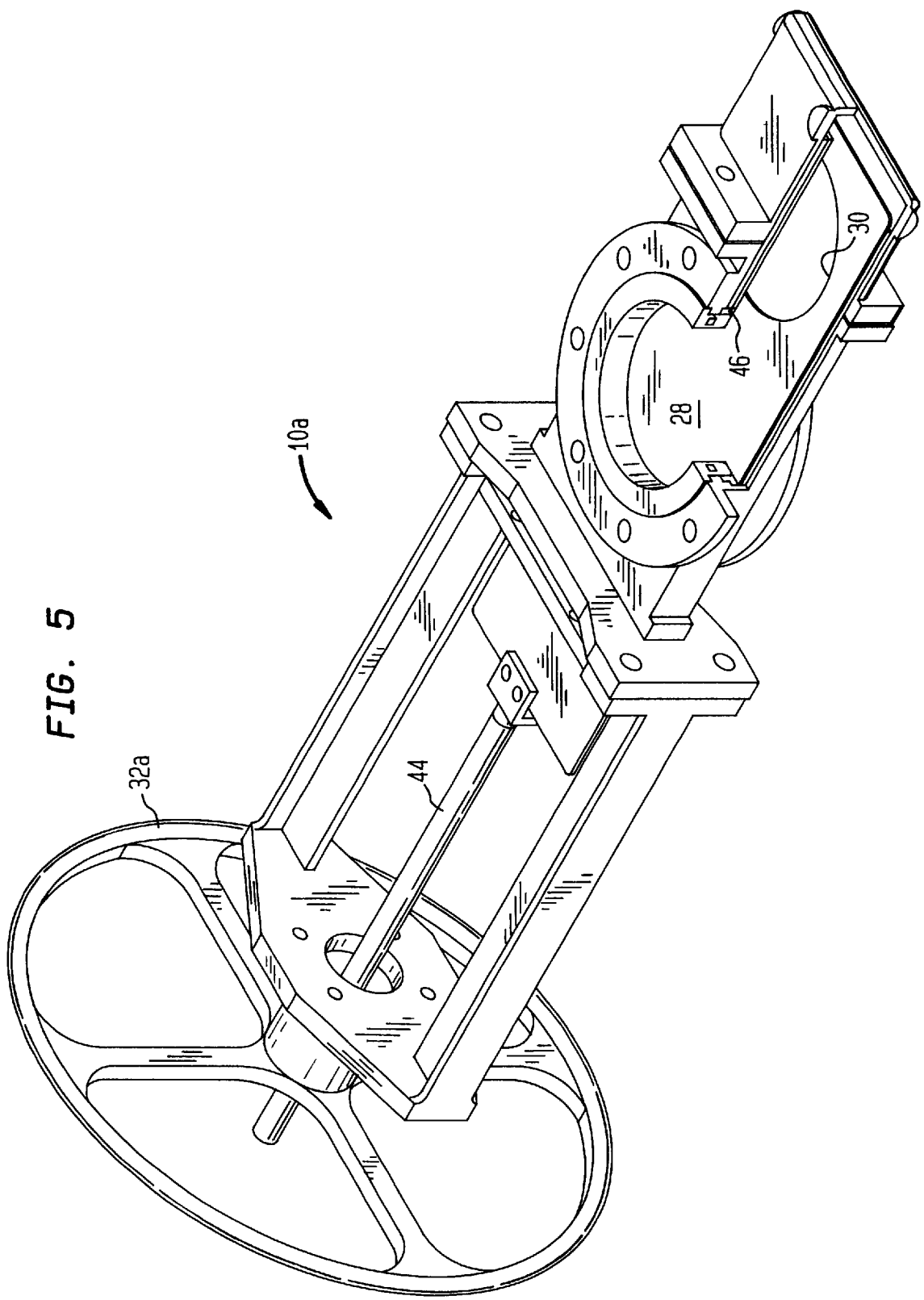
FIG. 5 is a perspective view, partly cut away, of an alternative embodiment of the novel slide gate valve.
Figure 6:
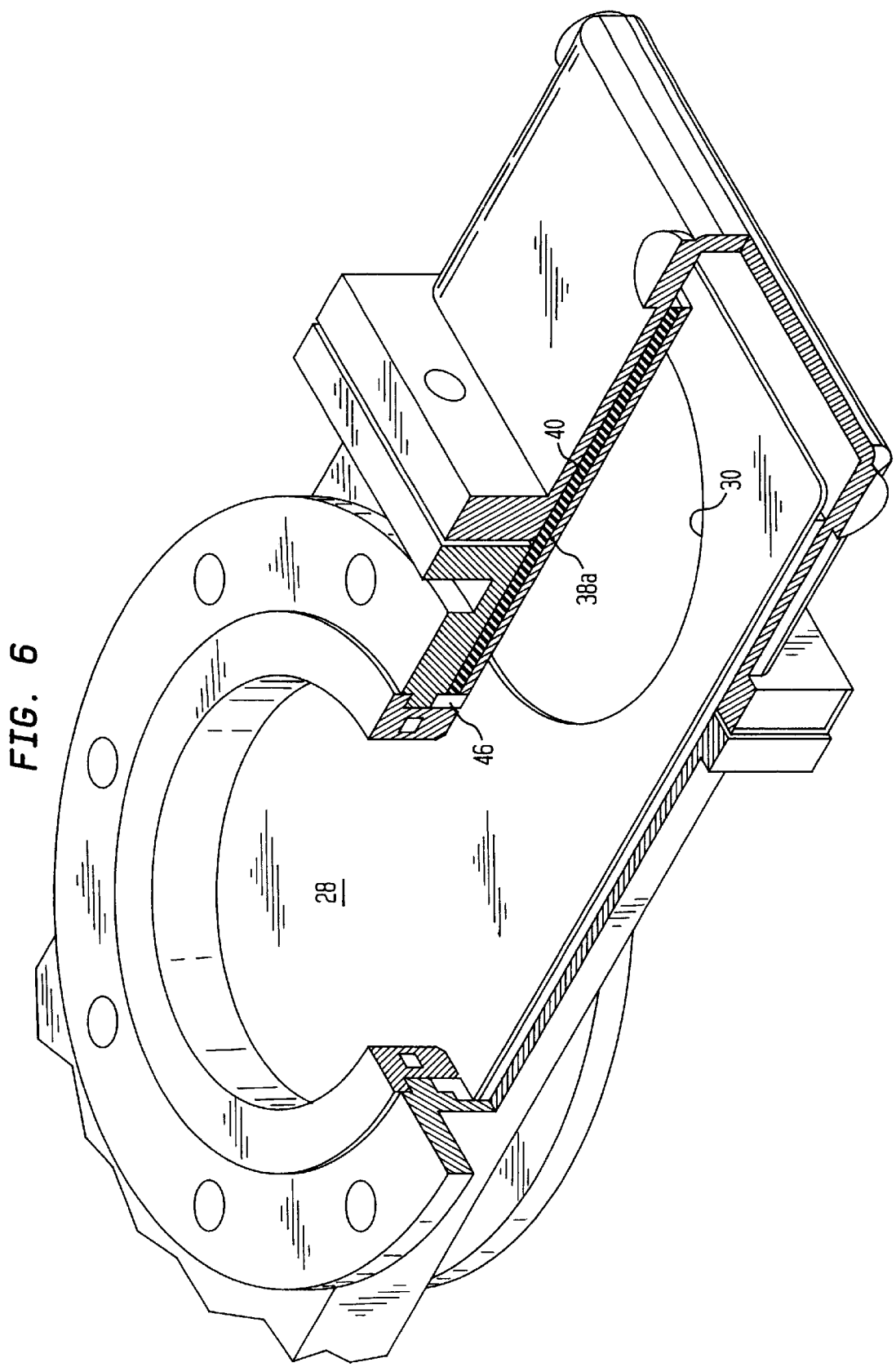
FIG. 6 is a greatly enlarged depiction of the circled area of FIG. 5.

FIG. 5 depicts an alternative embodiment of the novel valve 10a which, in lieu of the fluid actuator 32 (in FIGS. 1 and 2) a handwheel 32a effects translation of the gate 28, via a threaded rod 44. An enlarged detail of the circled portion of FIG. 5 is shown in FIG. 6, and here is shown an alternative feature of the invention. The flexible, plastic liners 38a (one only being shown herein) has incorporated therewith a sealing ring 46 which rims the aperture 42 of the panel-type liners 38a. Ring 46 also has a metal annulus 48 therewithin as a reinforcement. Reinforced ring 46 supports the gate 28 when the latter is in its closed position and the pipeline pressure is acting against one side of the gate 28.

The invention comprehends the novel valves 10 and 10a, as well as valve body assemblies having the walled chamber 22 formed therein, with the liners 38 and 38a, the same comprising panels of flexible plastic material arranged in the chambers 22 for engaging the gate 28, and the elastomeric layers 40 which press the liners 38 and 38a, i.e., the flexible, plastic panels, against the gate in sealing engagement. Also, the invention comprehends the very panels, i.e., the liners 38 and 38a themselves, with the elastomeric layers 40 and the reinforcing metal annulus 48.

While we have described our invention in connection with specific embodiments therewith, it is to be clearly understood that this is done only by way of example, and not as a limitation to the scope of the invention, as set forth in the objects thereof and in the appended claims.

We claim:

1. A gate valve for use with high-density slurries, comprising:
    a valve body including a plurality of walls, said walls defining a chamber therewithin, two of said plurality of walls being disposed opposite to one another, each of said oppositely disposed walls including an aperture;
    a gate reciprocally disposed in said chamber for selectively occluding said apertures;
    reciprocating means coupled to said gate for reciprocating said gate in said chamber;
    liners for engaging opposite sides of said gate and prohibiting entry of slurry solids into said chamber, each of said liners comprising a non-metallic laminate formed by a flexible layer of plastic material disposed against a layer of elastomeric material, the layers of elastomeric material urging said flexible layers of plastic material into sealing engagement with said gate.

2. The gate valve of claim 1, wherein each said liner has an aperture formed therein, and a gate-supporting ring integral therewith and rimming said liner aperture.

3. The gate valve of claim 2, wherein said ring has a reinforcement therewith.

4. A valve body assembly useable in a gate valve for high-density slurries, the valve body assembly comprising:
    a valve body having a plurality of mutually confronting, parallel walls, said walls defining a chamber therewithin, a pair of said walls including apertures; and
    liner panels disposed in said chamber, said liner panels parallel with said pair of walls, said liner panels for engaging opposite sides of a valving gate and inhibiting entry of slurry solids into said chamber, said liner panels each comprising a non-metallic laminate formed by a flexible layer of plastic material disposed against a layer of elastomeric material, said layers of elastomeric material urging said flexible layers of plastic material into a fast, sealing engagement with a valving gate.

5. The valve body assembly of claim 4, wherein each said liner panel has an aperture formed therein, and a gate-supporting ring integral therewith and rimming said liner panel aperture.

6. The value body assembly of claim 5, wherein said ring has a reinforcement therewith.

* * * * *